(12) United States Patent
Coon

(10) Patent No.: US 6,295,723 B1
(45) Date of Patent: *Oct. 2, 2001

(54) APPARATUS FOR BUILDING HEAD STACK ASSEMBLIES

(75) Inventor: Warren Coon, Temecula, CA (US)

(73) Assignee: Magnecomp Corp., Temecula, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,011

(22) Filed: Feb. 3, 1999

Related U.S. Application Data

(60) Provisional application No. 60/085,182, filed on May 12, 1998.

(51) Int. Cl.[7] .................................................. G11B 5/42
(52) U.S. Cl. ............................. 29/760; 29/603.3; 29/761
(58) Field of Search ............................... 29/603.03, 729, 29/281.6, 283, 428, 464, 468, 272, 278, 238, 760, 761; 81/177.2, 124.5; 403/112, 113, 116; 24/597, 569, 588

(56) References Cited

U.S. PATENT DOCUMENTS

| | | | |
|---|---|---|---|
| 5,090,670 | * 2/1992 | Yang | 269/249 |
| 5,265,325 | * 11/1993 | Fortin | 29/742 |
| 5,351,981 | * 10/1994 | Thomas | 280/301 |

* cited by examiner

*Primary Examiner*—Carl E. Hall
(74) *Attorney, Agent, or Firm*—Louis J. Bachand

(57) ABSTRACT

An apparatus for building a head stack assembly from an array of head stack assembly subassemblies comprising apertured actuator arms, mounting plates, and load beams in aperture registered relation for staking that applies uniform clamping force against possibly angled subassemblies by pivoting the engagement head to be flush with the subassemblies as presented, and increases support of the mounting plates against distortion during staking by reducing the difference in size of the spacer openings and the mounting plate openings and precisely aligning the smaller spacer openings from a locus spaced from and parallel to the subassembly array.

16 Claims, 9 Drawing Sheets

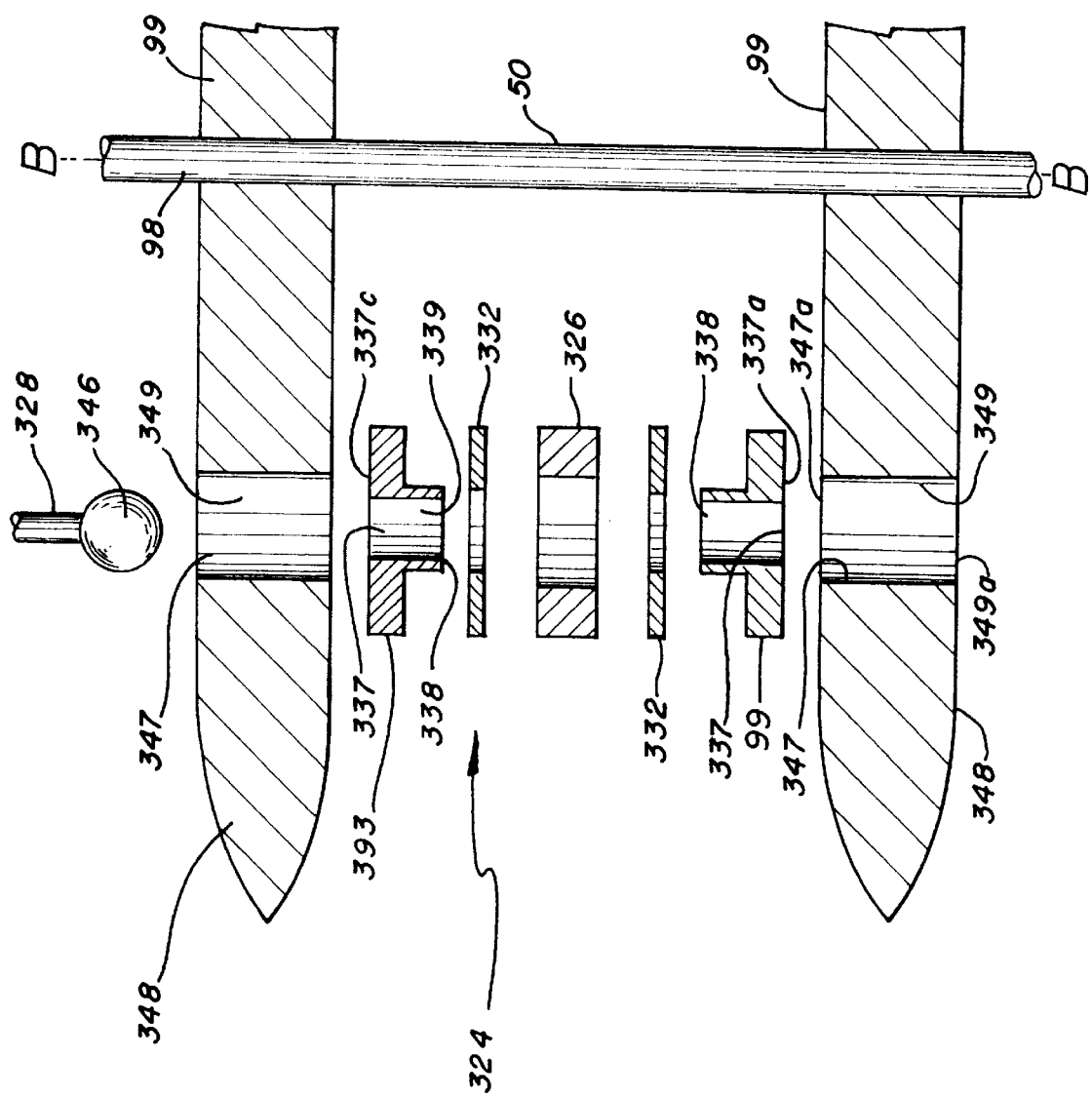

APPARATUS FOR BUILDING HEAD STACK ASSEMBLIES

REFERENCE TO RELATED APPLICATION

This application claims the benefit of U.S. Provisional Application Ser. No. 60/085,182, filed May 12, 1998.

BACKGROUND OF THE INVENTION

1. Field of the Invention

This invention relates to head stack assemblies for disk drives, and, more particularly, to an apparatus for the building of head stack assemblies from an array of head stack subassemblies that comprises an arm of an actuator having a plurality of arms, a load beam and a mounting plate, all apertured and in aperture registration for staking together with a staking tool. The invention provides apparatus that compensates for imperfectly stacked subassemblies to apply a uniform clamping pressure on the subassemblies despite one or more of the subassemblies being angled relative to the clamping nosepiece. The invention further relates to improvements in the support of mounting plates against distortion during the staking process, using spacers having substantially identical size apertures to the mounting plate apertures, rather than substantially larger as heretofore, so that the mounting plate aperture edge margins are supported by spacer aperture edge margins, and less distortion is suffered during staking, for a better head stack product. The invention further relates to methods of head stack building and to methods of aligning and supporting head stack subassemblies for staking with maximum precision and minimum mounting plate distortion.

2. Related Art

Head stacks are known, as are methods of building them from an array of head stack subassemblies. The typical head stack forming apparatus clamps an array of head stack subassemblies between a nosepiece and a baseplate. Force on the array is applied by tie nosepiece moving toward the baseplate. Spacers are provided between successive subassemblies. One function of the spacers is to support the mounting plate from becoming distorted by passage of the staking tool therethrough.

SUMMARY OF THE INVENTION

A lack of realized precision in the registration of the spacer apertures with the mounting plate apertures requires that the spacer apertures be relatively larger than required to simply pass the staking tool. The oversized spacer aperture will have edge margins which are back from and which do not register with or cover the corresponding edge margins of the mounting plate aperture. This lack of perfect edge margin registration leaves a penumbra of unbuttressed mounting plate aperture edge margin. Under such conditions the mounting plate flange surrounding the base of the tubular boss may flex and buckle under the axial force exerted by the staking tool. It is an object of the invention to better support the mounting plate during staking. It is a further object to improve the registration of the spacer aperture edge margin with the mounting plate aperture edge margin. A further object is to separately, and externally of the head stack, align the spacers and their apertures with precision, permitting reduction in the difference in size between the spacer apertures and the mounting plate apertures and providing an increased support of the mounting plate by the spacer.

When one or more of the subassemblies is less than perfectly aligned on the common axis through the registered apertures that define the staking tool path, the first subassembly, the one immediately opposite the nosepiece, is presented at an angle to the engagement face of the nosepiece. The nosepiece then contacts the higher portion of the subassembly first and exerts a greater force thereon as the clamping pressure is applied. One or more of the subassemblies or portions thereof, may become misaligned. The staking tool, typically one or more staking balls driven through the apertures defining the staking tool path, then will have to traverse less than a straight path with possible adverse consequences in the staking operation. It is a further object of the invention to improve the staking operation, particularly in those cases where the stack of subassemblies is less than perfectly aligned in the clamping apparatus. When the subassemblies are angled relative to the apparatus nosepiece, the application of clamping force can be nonuniform, the alignment of clamped subassemblies not straight, and the staking tool path nonaxial, resulting in yield losses. It is an object of the invention to adapt to a less than perfectly aligned set of subassemblies which present themselves at an angle to the nosepiece by angularly self-adjusting the nosepiece engagement head to be flush with the engaged subassembly, so that the clamping force is uniformly applied despite the angled relations.

These and other objects of the invention to become apparent hereinafter are realized in an apparatus for building head stack assemblies from an array of head stack subassemblies disposed generally perpendicular to a common axis, each head stack subassembly comprising an arm of a common actuator having a plurality of arms, a load beam and a mounting plate to be staked together through a series of apertures therein with a staking tool, the apparatus comprising a baseplate, a nosepiece having an engagement head shiftable toward the baseplate in clamping relation against the subassemblies, and a series of clamp/spacers between successive subassemblies in the array, the engagement head being pivotable on the engagement head for flush engagement with the subassembly array at different angles of the array to the nosepiece for uniform application of clamping force to the array regardless of the different angles of the array.

In this and like embodiments of the invention, typically: the common axis is a first common axis, and there is also included an alignment beam for the spacers disposed on a second common axis spaced from and parallel to the first common axis, the alignment beam maintaining the spacer apertures in registration with the subassembly apertures independently of the clamping apparatus; the nosepiece and engagement head define a guide for the staking tool; the nosepiece and engagement head are coaxially apertured to define the staking tool guide; the nosepiece comprises a first body adapted for axial shifting relative to the baseplate in subassembly clamping relation, and a second body defining the engagement head, the second body being pivotally mounted to the first body, the first body is generally cylindrical, the second body is generally cylindrical and is supported by the first body in interfitting relation, the first and second bodies being coupled for relative pivoting movement permitting the second body to engage the subassembly array flush at the angle of presentation of the subassembly array to the engagement head within an angle range of 0 to +/−3 degrees, the second cylindrical body is interiorly open and terminates adjacent the subassembly array in a transverse wall having interiorly a dished shape, the first body having a cylindrical wall sized to fit within the second body cylindrical wall, the first body terminating adjacent the subassembly array in a dished wall congruent with and complementary to the second body wall dished shape for pivoting engagement therewith, and a fastener limiting separation of the first and second bodies during relative pivoting movement, the fastener comprising at least one rod and groove combination in which a rod is fixed in one of the first and second bodies and a rod-receiving groove is defined in the other of the first and second bodies, the rod being undersized relative to the groove to permit pivoting movement of the second body relative to the first body without axial separation of the first and second bodies, the second body cylindrical wall has a circularly distributed series of chordally located bores parallel to said second body transverse wall, each of the bores fixing a rod, the first body defining a circularly distributed series of rod-receiving chordally disposed grooves arranged to receive laterally an opposing rod fixed in the second body bore in first and second body coupling relation, the rods and bores being relatively sized to permit pivoting movement of the second body on the first body centered on their respective dished walls, and/or, the relative size of the rods and grooves is such that the first body can pivot as much as three degrees in any direction relative to the second body.

The invention provides in the foregoing apparatus a further embodiment in which, typically, the first body is generally cylindrical, the second body is generally cylindrical and supports the first body in interfitting relation, the first and second bodies being resiliently coupled for relative pivoting movement permitting the second body to engage the subassembly array flush at the angle of presentation of the subassembly array to the engagement head within an angle range of about 0 to +/−3 degrees; the second cylindrical body is terminates adjacent the subassembly array in a transverse wall having interiorly a dished shape, the first body having a cylindrical wall sized to fit onto the second body, the second body terminating in a dished wall complementary to the first body wall dished shape for pivoting engagement therewith, and a spring member coupling and resiliently limiting separation of the first and second bodies during relative pivoting movement; each of the first and second bodies defines spring member fasteners fastening the spring member in position to permit pivoting movement of the second body relative to the first body without axial separation of the first and second bodies; and/or the spring member comprises plural springs circularly distributed about said first and second bodies, the springs being such that the second body can pivot as much as three degrees in any direction relative to the first body.

In a further embodiment, the invention provides an apparatus for building head stack assemblies from an array of one or more head stack subassemblies which are axially elongated and disposed generally parallel with each other and perpendicular to a common axis defined by a staking tool path through the array, each head stack subassembly comprising an arm of a common actuator having a plurality of arms, a load beam and a mounting plate, the arms, load beams and mounting plates having registered staking apertures coaxial with the common axis, the apparatus comprising a relatively fixed baseplate, a relatively movable nosepiece having an engagement head shiftable toward the baseplate on the common axis in subassembly clamping relation, and a series of apertured spacers between successive subassemblies in the array, the engagement head pivoting in response to contact with the opposing surface of the array to be flush with the array at the locus of the contact whether or not the array opposing surface is angled or perpendicular to the common axis and to exert a uniform force on the array throughout the locus of contact.

In this and like embodiments, typically: the nosepiece and engagement head are apertured on the common axis and define a tubular guide for the staking tool, the staking tool comprising a staking ball adapted to be forced through the apertures of the subassemblies in staking relation; the tubular guide is registered with the registered staking apertures; the second body is generally cylindrical, the first body is generally cylindrical and is supported by the second body on a pivot; the first and second bodies being coupled for relative movement permitting the second body to lie flush against the subassembly array at different angles of presentation of the subassembly array to the engagement head, the second body will pivot up to three degrees in any direction to lie flush against the subassembly array; and, there is further included circularly distributed grooves on the periphery of the first body, a series of rods passing chordally through the second body in second body grooves-intersecting relation to couple the first and second bodies to each other in pivoting relation.

In its method aspects, the invention provides a method of staking together an array of head stack assembly subassemblies each comprising an arm of an actuator having a plurality of arms, a load beam and a mounting plate, including aligning the subassemblies spaced apart by intervening spacers for staking on a common axis, clamping the subassemblies in aligned relation between a nosepiece having an engagement head with an engagement face and a baseplate, pivoting the engagement head to be flush with the array to apply a uniform force across the engagement face of the engagement head whether the array is perpendicular to the common axis or angled with respect thereto, and staking the subassemblies together along the common axis in the engaged condition of the engagement face and the subassemblies.

In this and like embodiments, typically, the method includes capturing the engagement head on the nosepiece with a rod and groove fastener, the fastener rod and groove interfitting loosely to permit pivoting movement of the head relative to the nosepiece to an angle to be flush with the subassemblies, and, orienting each spacer at a common angle to each the load beam in each the subassembly, defining an alignment hole in each the spacer on a second common axis parallel to and spaced from the common axis, and extending an alignment beam through the alignment holes to maintain the subassemblies aligned on the common axis, and staking the subassemblies in the maintained alignment.

In a further method aspect, the invention provides a method of staking together an array of head stack assembly subassemblies each comprising an arm of an actuator having a plurality of arms, a load beam and a mounting plate, including primarily aligning the subassemblies for staking on a first common axis in alternating relation with a plurality of spacers with the spacers angularly displaced from the load beams, the spacers having aligning holes on a second common axis spaced from and parallel to the first common axis, clamping the subassemblies in aligned relation between a nosepiece having a movable engagement head with an engagement face and a baseplate, secondarily aligning the subassemblies with an aligning beam extending through tie spacer aligning holes, and staking the subassemblies together along the common axis in primary and secondary aligned relation.

In this and like embodiments, typically: the method also includes pivoting the engagement face to be flush with the subassembly in contact therewith for uniform application of clamping force on the subassemblies, supporting the engagement head for pivoting movement on the nosepiece with a fastener only loosely capturing the engagement head on the nosepiece, defining in the engagement body a peripherally distributed series of grooves, disposing in each the groove a fastening rod supported by the nosepiece to couple the nosepiece and the engagement body, maintaining the grooves oversized relative to the rods for a loose fit, and pivoting the engagement body on the nosepiece to permit flush engagement of the engagement body face with the head stack subassembly array within the limits of the loose fit, and/or, maintaining the loose fit to limit the pivoting of the engagement body to plus or minus three degrees from a plane perpendicular to the first common axis.

The invention further provides, in a highly particular aspect, a head stack assembly staking apparatus comprising a nosepiece and a baseplate arranged for clamping an array of head stack subassemblies in spaced relation along a primary common axis, a series of spacers inserted between the subassemblies to define their spacing, each subassembly comprising an arm of an actuator having a plurality of arms, a load beam and a mounting plate having a smaller and a greater aperture on opposite ends of a common bore, each arm, load beam, and spacer having an aperture registered with the other apertures, the spacer apertures being next to and registered with the mounting plate larger apertures, the registered apertures jointly defining a staking tool path for passing a staking tool in subassembly staking relation, the spacer aperture edge margins supporting each adjacent mounting plate to a greater or less extent against distortion during staking as a function of the greater or less identity respectively in size between the spacer apertures and the mounting plate apertures, the identity in size between the spacer apertures and the mounting plate apertures being limited by the need to have increased size spacer apertures to freely pass the staking tool when the spacers and the mounting plates are misaligned; an aligning beam supported by the baseplate and disposed along an axis spaced from and parallel to the staking tool path, the aligning beam precisely aligning the spacer apertures with the mounting plate larger apertures, the spacer apertures being substantially identical in size with the mounting plate larger apertures, e.g., within 0.002 inch in diameter, whereby the spacer aperture edge margins register with the mounting plate aperture edge margins and support the mounting plates against distortion.

The invention further provides a method of building a head stack assembly from an array of head stack assembly subassemblies comprising apertured actuator arms, mounting plates, and load beams in aperture registered relation for staking, including supporting a series of apertured spacers between successive subassemblies with the spacer aperture edge margins registered with and superimposed on the mounting plate edge margins to support the mounting plates against distortion during staking, and maintaining the alignment from a locus spaced from and parallel to the array.

BRIEF DESCRIPTION OF THE DRAWINGS

The invention will be further described as to several illustrative embodiments in conjunction with the attached drawings in which.

DETAILED DESCRIPTION

Figure 1:
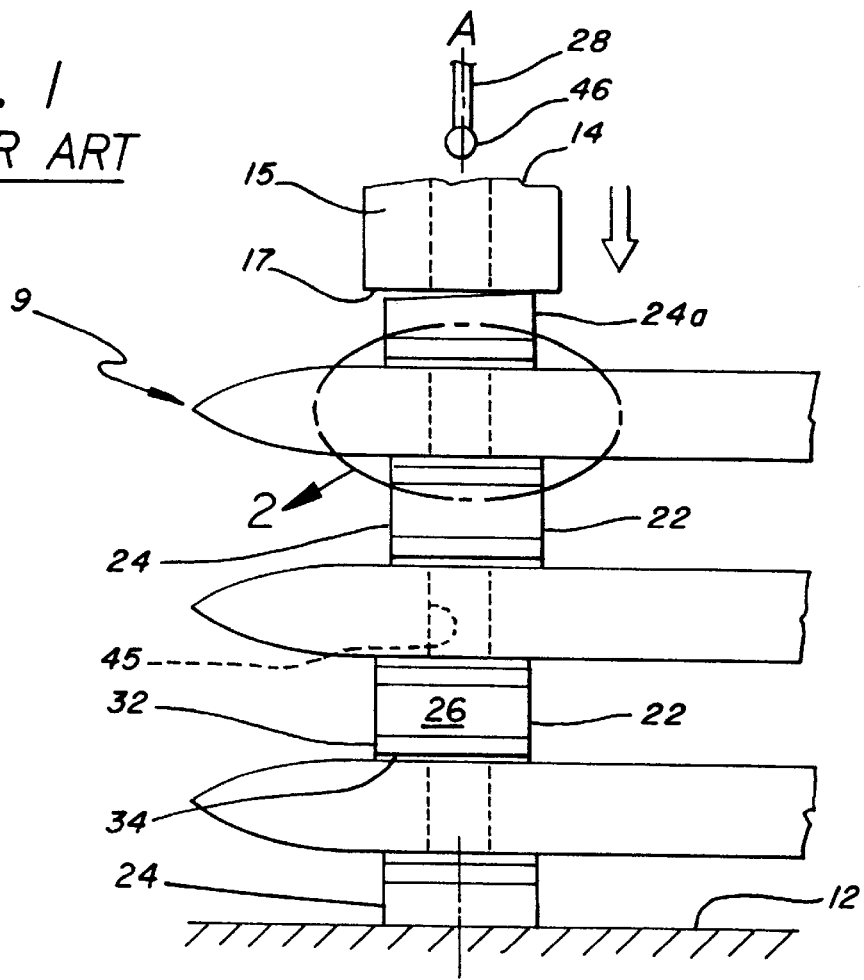
FIG. 1 is PRIOR ART side elevation view of a head stack assembly apparatus.

The typical staking fixture for head stack assemblies in the disk drive and read/write head industries acts to hold all the pieces to be assembled in their correct assembly position so they and the fixture can be loaded into the staking apparatus. The staking apparatus is designed to handle staking fixtures and head stack assemblies of any configuration. The staking apparatus comprises a baseplate upon which the rests the tooling including the clamp/spacers and parts to be staked, and a nosepiece which moves vertically and relative to the base plate to clamp the assembled fixture and parts together. The nosepiece defines a bore for passage of a staking ball, or other staking tool, after loading the fixture and head stack subassemblies into the staking apparatus, separated by spacers acting as clamps as well as spacers. Driving the staking tool or ball through the assembled parts completes the assembly process. The resultant head stack assembly is then removed from the fixture.

The staking fixture allows the clamping force applied by the staking apparatus to be passed through clamp/spacers between the mounting plates in the spaces that will be empty in the final finished head stack assembly product. The clamp/spacers have holes through them to allow the staking ball to pass through. They "float" in the sense that their vertical and rotational movements are free to comply with the actual position of the space they fill. The thickness of the clamp/spacer is very precisely controlled so that once they are in position and the assembly is clamped together, the clamp/spacers do not move the actuator arms out of the correct vertical relationship they have with each other.

The clamp/spacers should support the mounting plates of the suspensions as completely as possible to minimize the distortion of the mounting plate that occurs when the staking takes place. The ideal case would be that the mounting plates are completely supported by a uniformly applied force over the entire mounting plate (exposed side facing the disk) to oppose the force applied to the mounting plate boss side by the actuator arm through the load beam.

There are three clamp/spacers on a staking fixture for a six-headed stack. A six-headed head stack assembly is an aggregation of elements having thirty-eight separate surfaces, from the nosepiece face of the staking apparatus to the baseplate thereof.

In presently known staking fixture design, the through-holes in the fixture are larger than desirable, and given the present invention larger than necessary. Too large through-holes limit the support given the mounting plates; the mounting plates are not supported as much as it is possible to do. The spacer through-holes are typically 0.093 inch or larger in diameter, to allow passage of a staking ball that is usually 0.079 to 0.081 inch in diameter. Reduced diameter of the opening bore in a mounting plate, to less than 0.093 inch would improve the mounting plate design by affording more support around the bore which is subjected to staking forces and may on that account distort the mounting plate flange, but such size reductions cannot be practicably achieved with previously known apparatus because of a lack of precision registration of the through-holes.

Previous staking apparatus fixture design fails to provide for non-parallelism of the components that make up the thirty-eight surface preassembly arrangement before staking. While each surface is nominally flat and in parallel relationship with all the other surfaces, variations in flatness and parallelism occur and a clamping force applied by the nosepiece to the staking fixture will not assuredly be known to be transmitted uniformly across the mounting plate if there is a side-to-side, edge-to-edge discrepancy in the height of the stacked subassemblies. Any clamping force from the nosepiece will be preferentially applied to those portions of the stack that add up to the highest height. Therefore, unless the total (vector sum) of all the out-of-parallelism equals exactly 0 degrees (highly unlikely), the clamping force received by each mounting plate will be non-uniform across the plate. Uneven stacking of the several subassemblies or their components, sometimes by as much as +/−1−3° may result in different force at different locations. Effective staking together of the subassemblies requires their alignment be as nearly perfect as possible and thus uneven clamping force application is desirably avoided. Further efforts to reduce out-of-parallelism by closer tolerances in components, for example, are unduly expensive.

In the present invention, the presence of out-of-parallelism in the stack is compensated for in a way that enables provision of uniform clamping force automatically whenever an out-of-parallel condition is encountered. The nosepiece has a gimbaling feature attached to it that allows it to transmit the clamping force required, to pass the pin through its center as usual, but also allow it to apply a uniform force to surface that is not perpendicular to the axis of movement: of the nosepiece (which is the same as the axis of movement of the staking pin) or parallel to the baseplate.

The uniform clamping force enables more consistent staking results, especially when combined with now possible closer sizing of the registered through-holes, particularly at the interface of the clamp/spacers and the mounting plate flanges. This closer size relationship in turn means the mounting plate flange is more extensively and closely supported against distortion. Through-hole size can be reduced to just clear the staking ball.

Further, to accommodate the manufacturing tolerances that would tend to degrade the locational accuracy of the clamp/spacers, an alignment beam is used in the invention to locate the clamp/spacers before they are fixed into staking position. The clamp/spacers have a second tooling hole in a known constant positional relationship to the clearance through-hole for this purpose. Thus, the through-hole clearance is reduced in diameter to barely clear the ball size, e.g., a ball 0.081 inch and clearance hole 0.082 inch in diameter.

Figure 2:
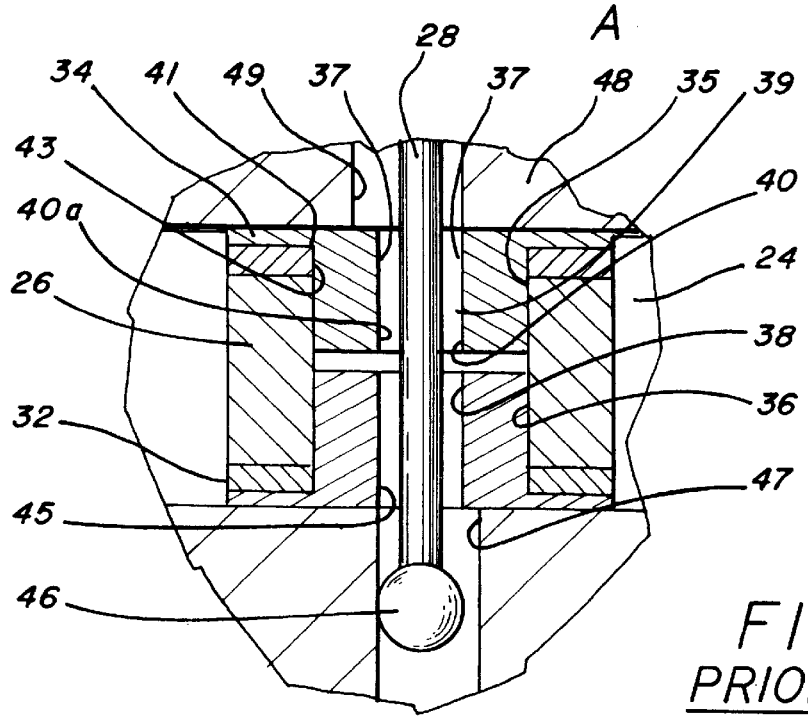
FIG. 2 is a PRIOR ART view taken on line 2 in FIG. 1.
Figure 10:
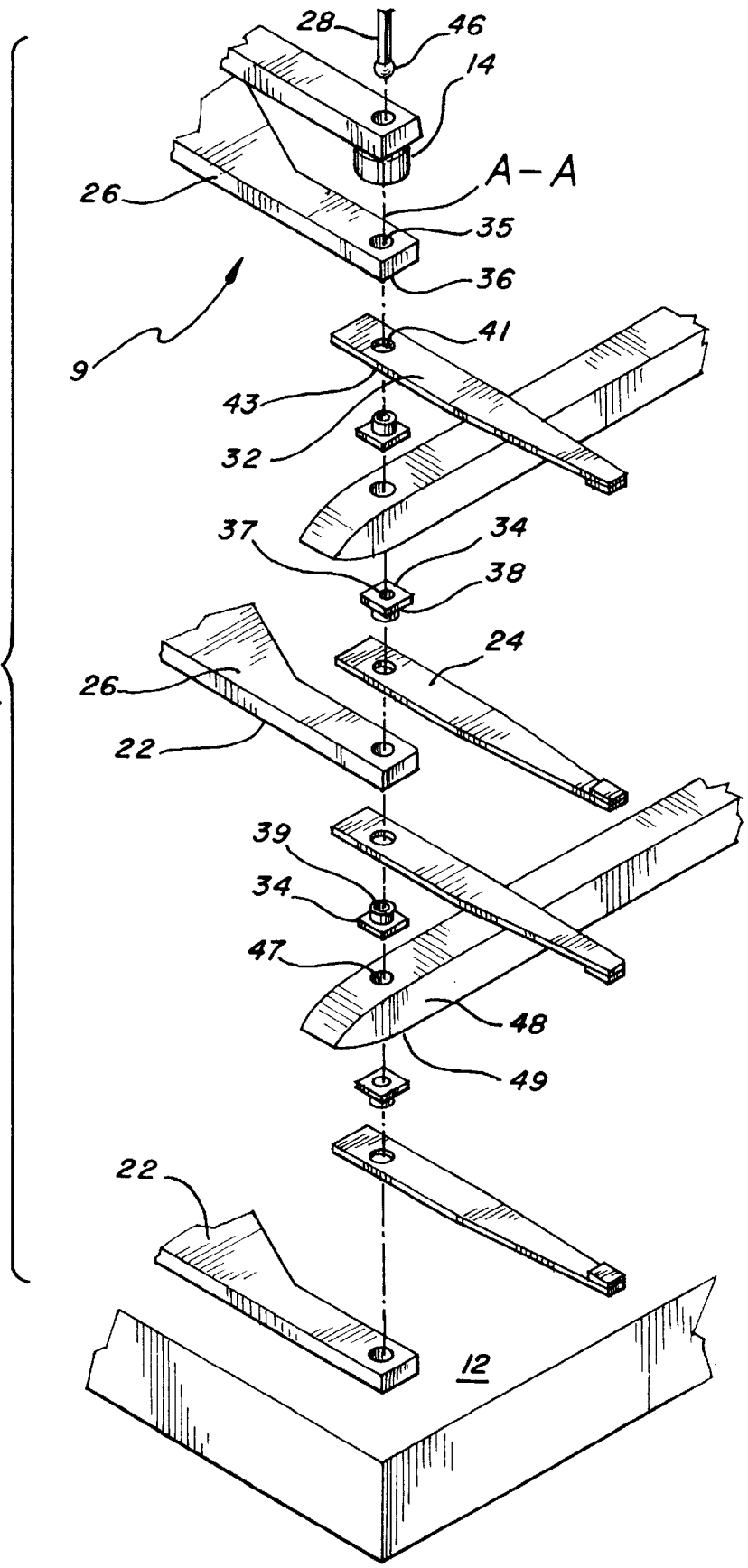
FIG. 10 is a PRIOR ART exploded view of a head stack assembly apparatus.
Figure 11:
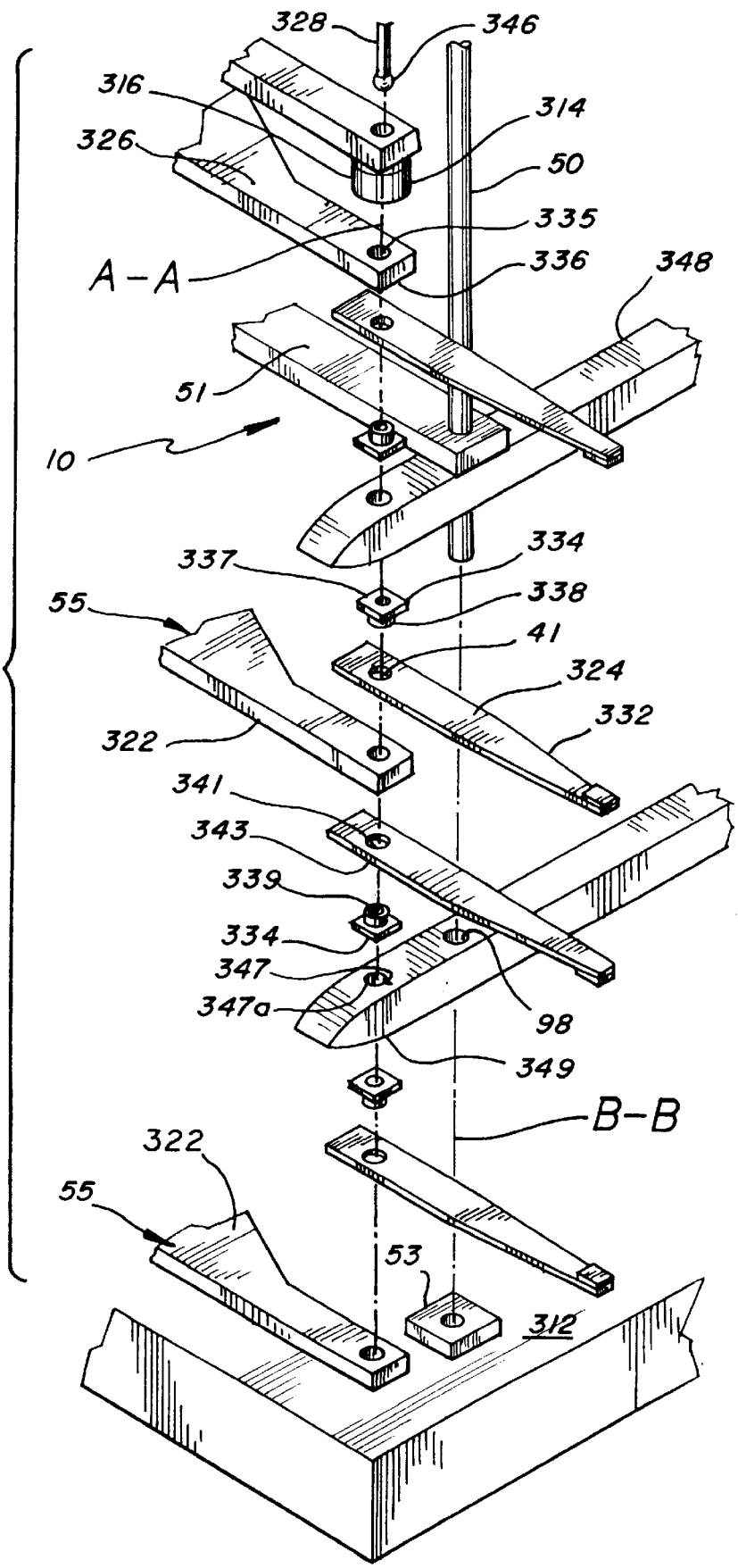
FIG. 11 is a view like FIG. 10, but of the invention head stack assembly apparatus.

With reference now to the accompanying drawings, in FIGS. 1, 2 and 10 a typical PRIOR ART stack assembly apparatus is shown at 9 and comprises a baseplate 12, a nosepiece 14 having an engagement head 15 with an engagement face 17. The nosepiece 14 is mounted to be shiftable by conventional means (not shown) toward the baseplate 12 to define a clamp having as jaw elements the nosepiece 14 and baseplate 12. Positioned within the apparatus 10 is an array 22 of head stack subassemblies 24 disposed generally perpendicular to a common axis A—A. Each head stack subassembly 24 comprises an arm 26 of a common actuator such as an E-block having a plurality of arms (not shown), a load beam 32 and a mounting plate 34 to be stafed together through a series of through hole apertures: 35, 36 in the actuator arm 26; 37 in the mounting plate 34 leading to boss 38, boss bore 39; and boss bore opening 40; and apertures 41, 43 in the load beam 32 with a staking tool in the form of staking ball 46 suitably driven by pin 28. The several subassemblies 24 have a series of spacers 48 between them in the array 22; Spacers 48 act as fixture clamps as well as maintain spacing between subassemblies. Clamp spacers 48 have through-hole apertures 47, 49 oversized relative to the opposing mounting plate apertures. As shown in FIG. 1, the several subassemblies 24 can be stakable and yet not perfectly aligned as the cumulative discrepancies in surface parallelism will affect the orientation of the first subassembly 24a (and all other subassemblies) relative to the engagement head 15, as shown in the Figure. In FIG. 2, also PRIOR ART, the effect of the less than perfect alignment is depicted, with engagement head 15 tending to compress the stacked subassemblies 24 more on one side than the other, with the result that the path 45 of the staking ball 46 is closer to one side of the aligned apertures, e.g. 40a. The staking is thus not uniform and the joint made can be defective.

Figure 3:
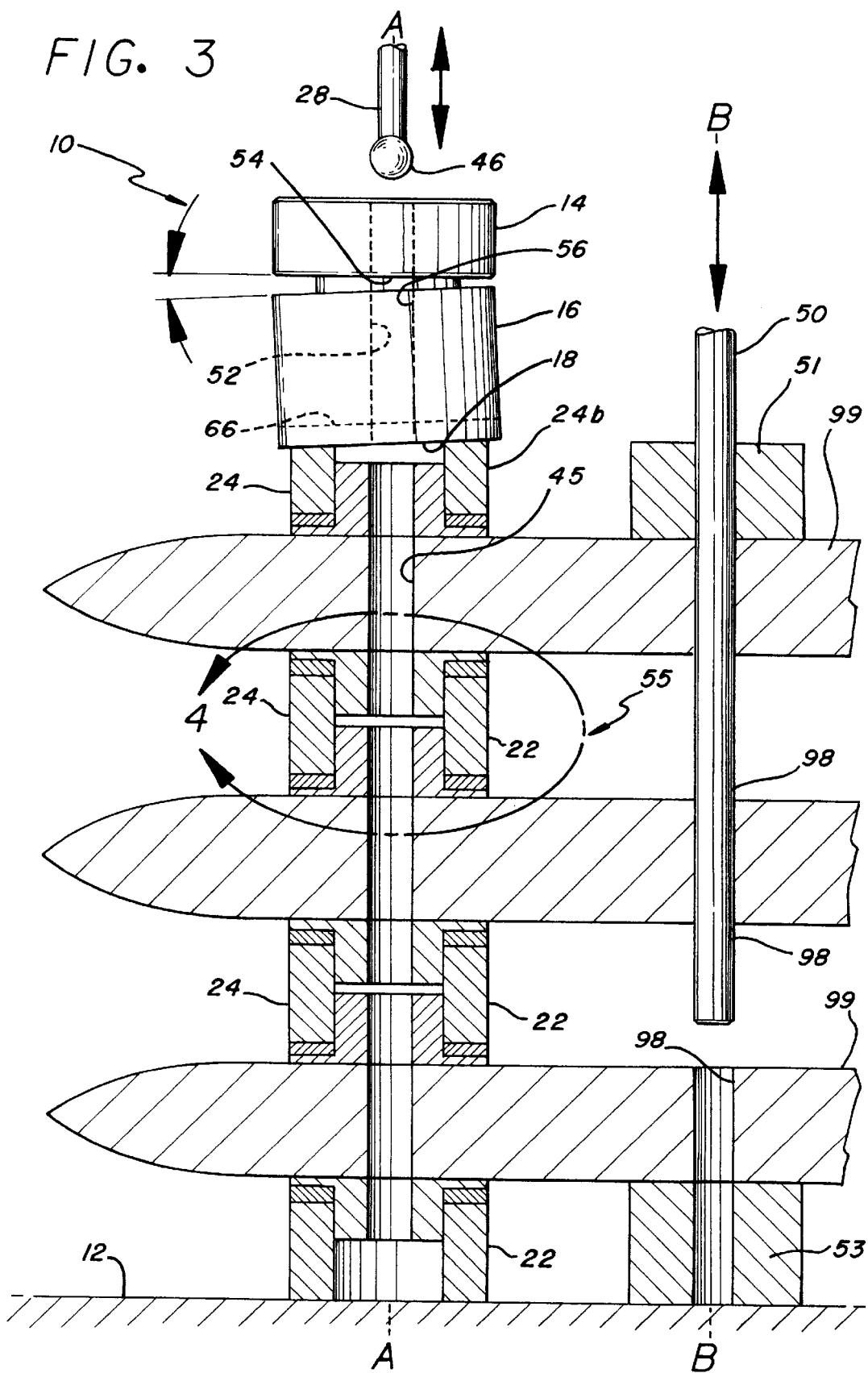
FIG. 3 is a view in side elevation of the invention head stack assembly.
Figure 4:
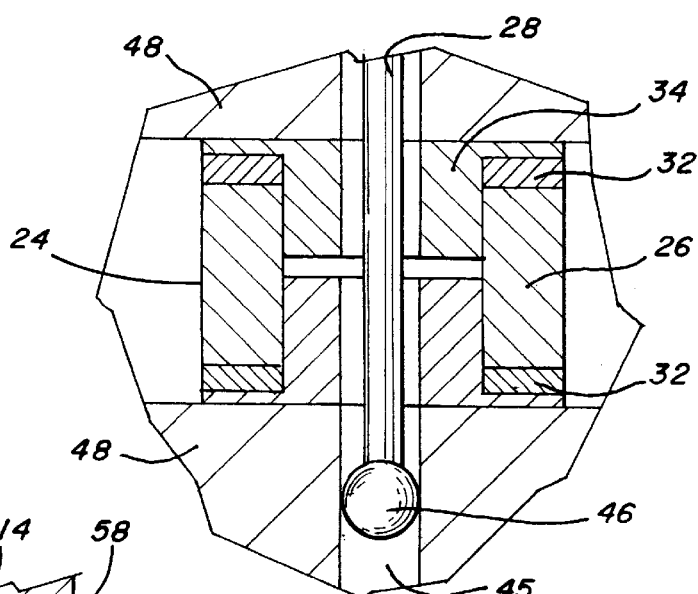
FIG. 4 is a view taken on line 4 in FIG. 3.

In FIGS. 3 and 4 the invention apparatus is shown at 10 with like parts having like numerals to FIGS. 1, 2 and 10. In the invention the engagement head 16 is shown in FIGS. 3 and 4 to be pivotable on the nosepiece 14 for flush engagement of its engagement face 18 with the opposing subassembly 24b and the entire subassembly array 22 at different angles of the array to the nosepiece for uniform application of clamping force to the array regardless at the different angles of the array, typically up to +/−3 degrees.

As later described in detail in connection with FIGS. 13 and 15, the clamped subassemblies 22 in FIGS. 3 and 4 are secondarily aligned on a second common axis B—B parallel to the first common axis A—A and spaced therefrom. The secondary alignment is effected by an alignment beam 50 (either physical such as a rod as shown or a light or laser beam) supported above by bar 51 and below by bar 53 fixed to baseplate 12 for the spacers 99, the beam being disposed on the second common axis B—B. The alignment beam 50 maintains the spacer apertures in registration with the subassembly apertures independently of the clamping fixture 55 portion of apparatus 10, See FIGS. 3 and 13. The nosepiece 14 and engagement head 16 define an axially elongated guide channel 52 (coaxial with the staking tool path 45) for the staking tool ball 46 by the coaxial alignment of their apertures 54, 56.

With particular reference to FIGS. 5, 6, 7 and 8, the nosepiece 14 comprises a first body 58 axially rotatable and shiftable relative to the baseplate 12 in subassembly clamping relation, and a second body 62 defining the engagement head 16 and engagement face 18. In this embodiment the second body 62 is pivotally mounted to the first body 58. The first body 58 is generally cylindrical, as is the second body 62, the second body being supported by the first body in interfitting relation, as shown. The first and second engagement head bodies 58, 62 are coupled for relative pivoting movement, see FIG. 5, permitting the second body engagement face 18 to engage the subassembly array 22 flush, i.e. in fall surface contact, edge to edge, as force is applied without preferential or biased clamping force from contact solely at one or another part of the engagement face 18 and subassembly 24b surfaces whatever the angle of presentation of the subassembly or array 22 to the engagement face 18 within an angle range of typically 0 to +/−3 to degrees. See FIG. 3 and FIG. 5.

Specifically, the engagement head 16 comprises a cylindrical second body 62 having a wall 60 interiorly open at 64 and which terminates at 66 adjacent the subassembly array 22 (FIG. 3) in a transverse wall 68 having interiorly a dished shape 72 forming a pivot locus 74. The first body 58 has a cylindrical wall 76 sized to fit within the second body cylindrical wall 60, the first body terminating adjacent the subassembly array 22 (FIG. 3) in a dished wall 78 congruent with and complementary to the second body wall dished shape 72 for pivoting engagement therewith on pivot locus 74. The engagement head 16 further comprises a fastener 82 arranged to limit separation of the first and second bodies 58, 62 during relative pivoting movement about the pivoting locus 74 between dished shape 72 and dished wall 78.

The fastener 82 can be any structure or combination of structures holding the first and second bodies 58, 62 together in pivoting relation. In the illustrated embodiment, the fastener 82 comprises at least one rod and groove combination 86 in which a cylindrical rod 88 is fixed in one of the first and second bodies 58, 62 and a rod-receiving cylindrical groove 92 is defined in the other of the first and second bodies. The rod 88 is relatively undersized in comparison with the groove 92 to permit relative movement of the first and second bodies 58, 62, here in the form of relative pivoting movement of the second body on the first body without axial separation of the first and second bodies.

Figure 5:
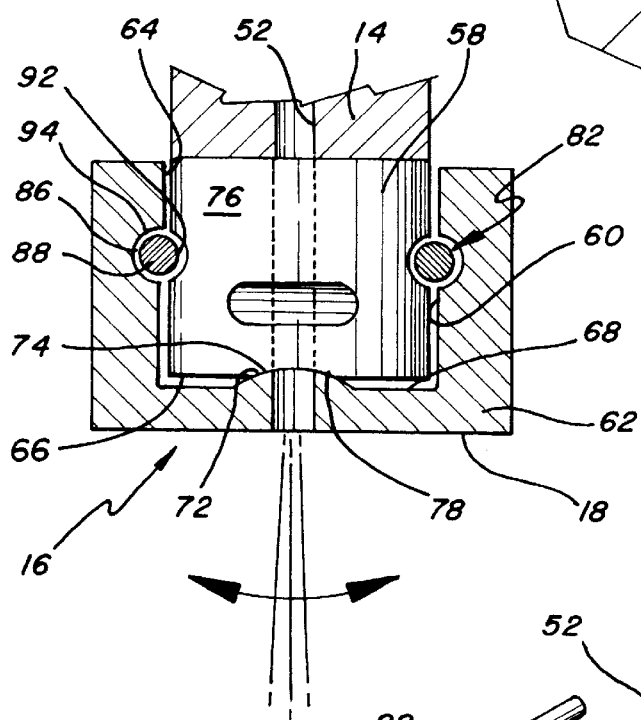
FIG. 5 is a view in vertical section of the invention apparatus nosepiece engagement head.
Figure 6:
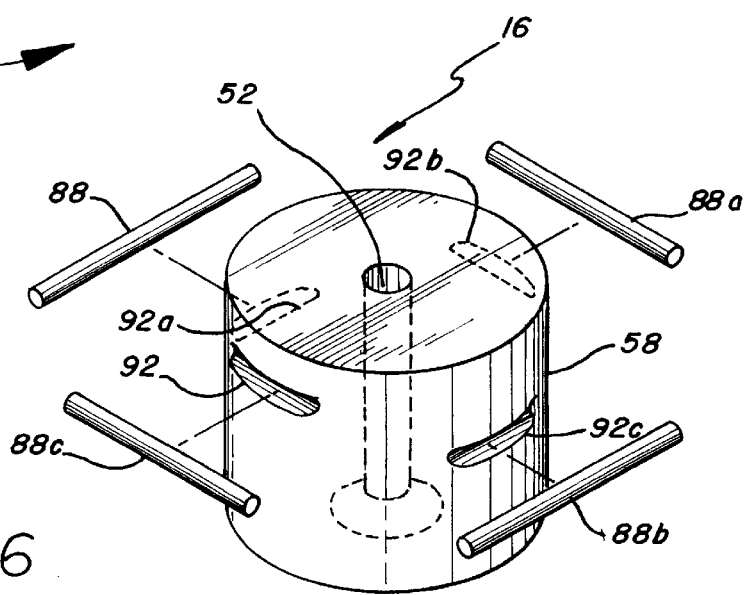
FIG. 6 is an axonometric view of the second body member of the nosepiece engagement head.
Figure 7:
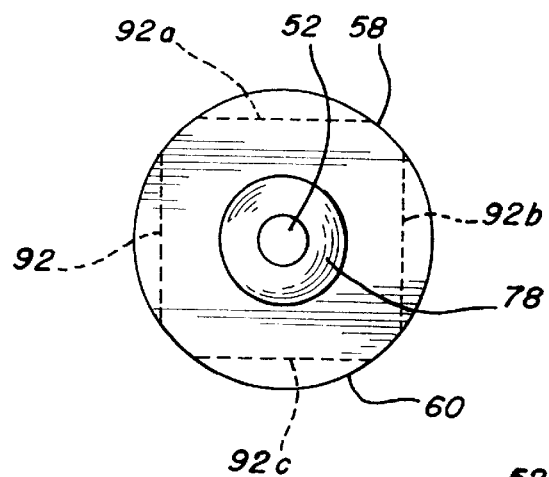
FIG. 7 is a bottom plan view of the nosepiece second body member.
Figure 8:
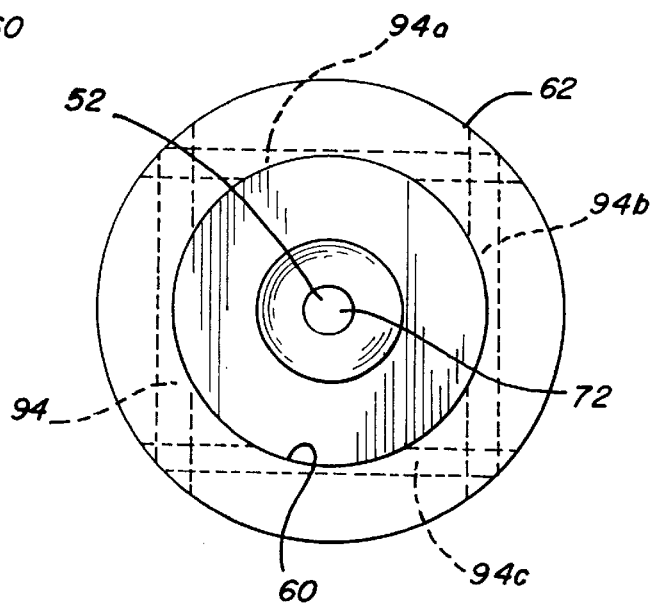
FIG. 8 is a bottom plan view of the first body member of the engagement head.

In the preferred mode shown, and with additional reference to FIGS. 7 and 8, the second body 62 cylindrical wall 60 has a circularly distributed series of chordally located cylindrical bores 94 spaced from and parallel to the second body transverse wall 68. Each of the bores 94, 94a, 94b and 94c fixes a rod 88, 88a, 88b or 88c. The first body 58 defines a circularly distributed series of rod-receiving chordally disposed grooves 92, 92a, 92b and 92c arranged to receive laterally an opposing rod 88, etc. fixed in the second body bores 94, etc. in first ad second body coupling relation as shown in FIG. 5. The rods 88, etc. and grooves 92, etc. are relatively sized to permit pivoting movement of the second body 62 within the first body. 58 centered on their respective dished shapes and walls 72, 78. Typically, the relative size of the rods 88 etc. and grooves 92, etc. is such that the second body 62 can pivot as much as three degrees in any direction relative to the first body 58.

Figure 9:
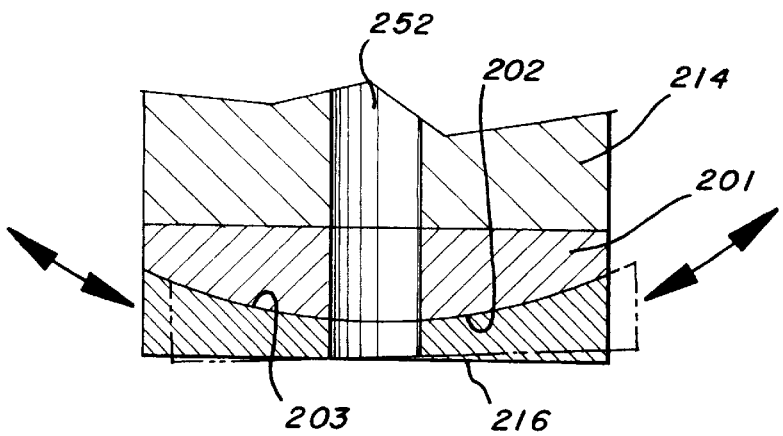
FIG. 9 is a fragmentary view in vertical section of an alternate form of the nosepiece first and second body members, assembled.

In an alternate form of the invention, shown in FIG. 9, in which like parts to the previous Figures have like numbers plus 200, nosepiece 214 has a section 201 which is outwardly convex at surface 202 to be congruent with and complementary to the opposing surface 203 of engagement head 216. Engagement head 216 is retained on nosepiece 214 by a suitable lubricant or other means of developing a vacuum therebetween upon developing axial separation, or other means, and will slide universally on the surface 202 to adapt its position to flush-engage the presented subassembly array (22 in FIG. 3).

Figure 12:
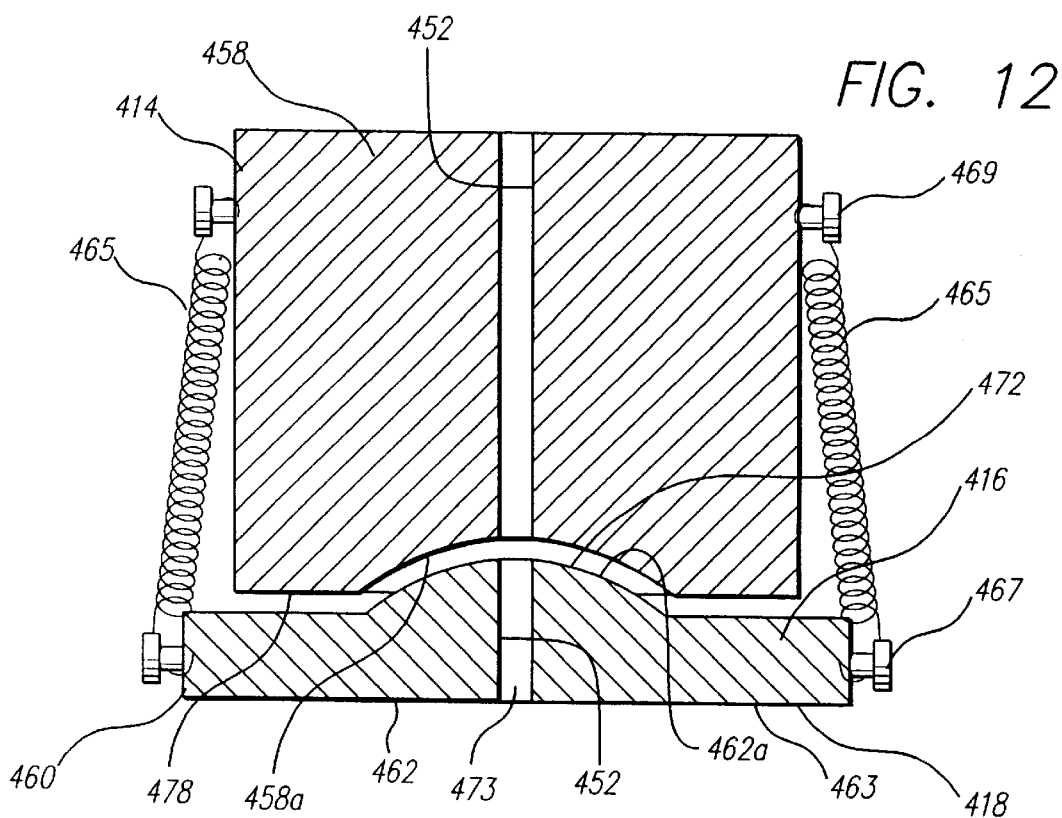
FIG. 12 is a view in vertical section of a further alternate form of the nosepiece first and second body members in accordance with a further embodiment of the invention.
Figure 13:
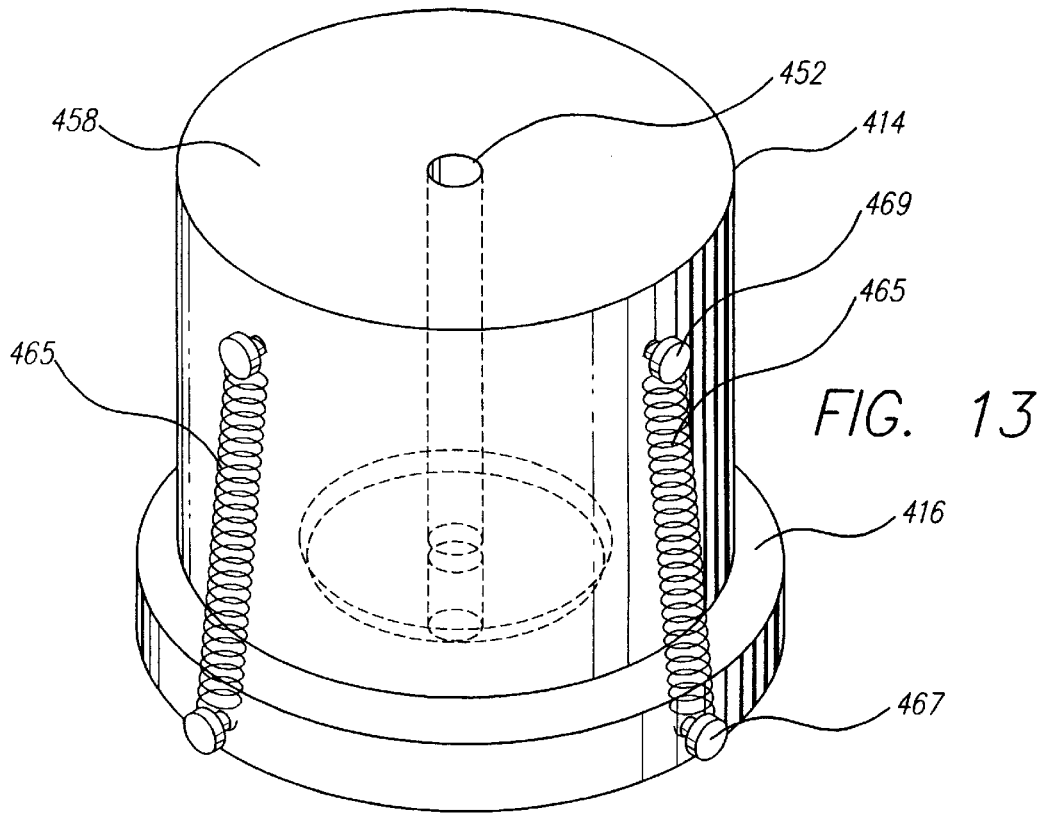
FIG. 13 is an isometric view thereof.

With reference now to FIGS. 12 and 13, in which like parts have like numbers to tie previous Figures plus 400, the nosepiece 414 comprises a first body 458 adapted for axial shifting relative to the baseplate (shown at 12 in FIG. 3) in subassembly clamping relation, and a second body 462 defining the engagement head 416 and the engagement face 418. In this embodiment the second body 462 is pivotally mounted to the first body 458. The first body 458 is generally cylindrical, as is the second body 462, the second body being supported by the first body in interfitting relation of their respective opposed concave and convex surfaces 458a, 462a. The first and second engagement head bodies 458, 462, are coupled for relative pivoting movement, See FIG. 13 and compare FIG. 5, permitting the second body engagement face 418 to engage the subassembly (22 in FIG. 3) flush, i.e., in full surface contact, edge to edge, as force is applied without preferential or biased clamping force from contact solely at one or another part of the engagement face 418 with the subassembly (24b in FIG. 3) surfaces whatever the angle of presentation of the subassembly or array to the engagement face 418 within an angle range of typically 0 to +/−3 to degrees.

Specifically, the engagement head 416 comprises a generally disk-shaped second body 462 having a circular wall 460 with a dish-shaped boss 472 centrally apertured at 473 to partially define channel 452. Head second body 462 terminates in circular wall 463 defining the engagement face 418 to be placed opposed to the array (22 in FIG. 3). The engagement head 416 further comprises first body 458, generally cylindrical and provided with a concave dished wall 478 that registers with and moves upon boss 472 in pivoting relation to permit adjustment of the engagement head 416 to an off-level position of the array (22 in FIG. 30).

The first and second bodies 458, 462 in this embodiment are coupled with a series of resilient elements in the form of tension springs, 465, typically 2 to 4, that are mounted to the second body at pegs 467 and to the first body at pegs 469. The pivoting movement of the second body 462 engaged with the array is accommodated by sliding relation of the congruent boss 472 of the second body and the opposing concave portion 478 of the first body 458, with the movement constrained by the springs 463 in the vertical and rotational directions. The aligned first and second bodies 458, 462 define the axially elongated guide channel 452 (coaxial with the staking tool path as in the previous embodiment) for the staking tool ball 46 to pass through toward the array.

In its method aspects, the invention of FIGS. 1–9 provides a method of staking together an array 22 of head stack assembly subassemblies 24 each comprising an arm 26 of an actuator (not shown) having a plurality of arms, a load beam 32 and a mounting plate 34. The method includes aligning the subassemblies 24 spaced apart by intervening clamp/spacers 28 for staking on a common axis A—A, clamping the subassemblies in aligned relation between a nosepiece 14 having an engagement head 16 with an engagement face 18 and a baseplate 12, pivoting the engagement head to be flush with the array so as to apply a uniform force across the engagement face of the engagement head whether the array is perpendicular to the common axis or angled with respect thereto, and staking the subassemblies together along the common axis in the engaged condition of the engagement face and the subassemblies. In the method, the engagement head 16 is captured on the nosepiece 14 with a rod 88 and groove 92, 94 fastener arrangement. The fastener rod 88 in groove 94 of second body 62 and groove 92 in first body 58 interfit loosely to permit pivoting movement of the head 16 relative to the nosepiece 14 to an angle for the face 18 to be flush with the subassemblies 24.

Figure 14:
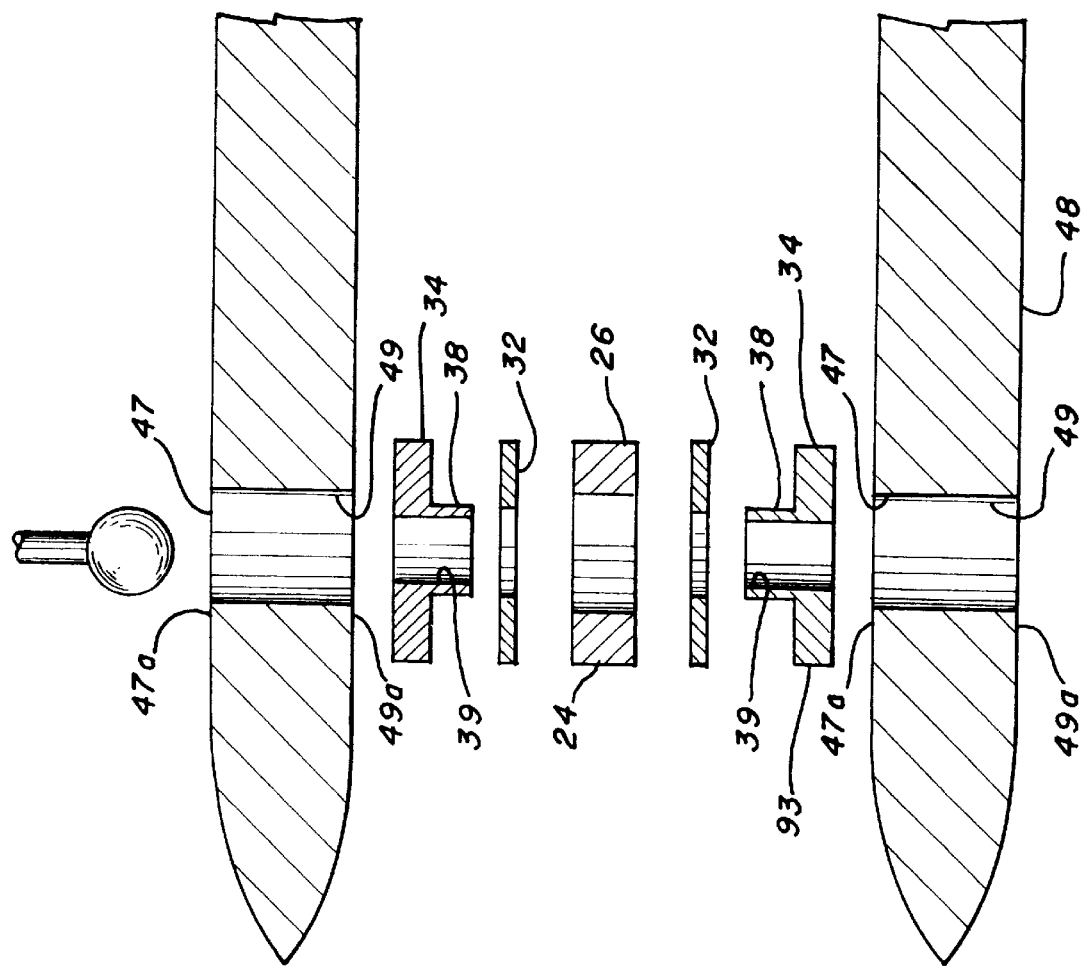
FIG. 14 is PRIOR ART fragmentary, exploded view of a suspension subassembly arranged for staking; and, FIG. 15 is a view like FIG. 14 of a suspension subassembly according to the invention, arranged for staking.

With reference to PRIOR ART FIGS. 10 and 14, respectively, a head stack assembly staking apparatus and head stack subassembly are shown comprising a nosepiece (No. 14 in FIG. 1) and a baseplate 12 arranged for clamping an array 22 of head stack subassemblies 24 in spaced relation along a primary common axis A—A. A series of clamp/spacers 28 are inserted between the subassemblies 24 to define their spacing. Each subassembly comprises an actuator arm 26, a load beam 32 and a mounting plate 34 having a greater aperture 37 and a smaller aperture 38 on opposite ends of a common bore 39. Arms 26, load beams 32, and spacers 28 have apertures 35, 36; 41, 43 and 47, 49 respectively, registered respectively with the other apertures. The spacer apertures 47, 49 are immediately next to, contiguous with, and registered with the mounting plate larger apertures 37. The registered apertures 35, 36; 41, 43; 47, 49 jointly define the staking tool path 45 for passing staking tool ball 46 in subassembly staking relation.

In FIGS. 13 and 15, depicting the invention, and in which like parts to FIGS. 10 and 14 parts have like numbers plus 300, spacers 348 have apertures 347, 349. Spacer apertures 347, 349 have edge margins 347a, 349a supporting each adjacent mounting plate 334 to a greater extent than the edge margins 47a, 49a surrounding the apertures 47, 49 in the PRIOR ART FIGS. 10 and 12, being more nearly identical in size with the mounting plate apertures 337.

Protection of the mounting plates 334 against distortion during staking is in part a function of the identity in size between the spacer apertures 347, 349 and the mounting plate apertures 337, 349. As shown in the PRIOR ART FIGS. 10 and 14, however, the achievement of an identity in size between the spacer apertures 47, 49 and the mounting plate apertures 37 is limited by the need to have increased size spacer apertures to freely pass the staking tool ball 46 when the spacers 28 and the mounting plates 34 are not perfectly aligned.

In FIGS. 13 and 15, showing the invention, an aligning beam 50 is provided supported by the baseplate 312 and disposed along an axis B—B spaced from and parallel to the staking tool path 45 and its axis A—A. A second series of apertures 98 is formed in the outboard portions 99 of the spacers 48. The second series apertures 98 do not have to pass a staking tool. They can be and are precisely bored to the desired diameter for precisely sized rod beam 50 and in a precisely located area so as to register with one another when the spacers 348 are assembled with the subassemblies 324. Apertures 98 are further precisely distanced from the staking tool passing apertures 347, 349 in the spacers 348. In this manner, when the second series of apertures 98 ire precisely aligned, the apertures 347, 349 are likewise aligned precisely. Precision alignment of the spacer apertures 347, 349 enables these apertures to be made smaller than previously (FIG. 12) without sacrificing noninterfering passage of the staking tool ball 46 since the perfect alignment renders increased clearances, as found in the PRIOR ART FIGS. 10, 14 unnecessary.

Aligning beam 50 has a diameter closely approximating the diameter of each of the second series of apertures 98 to have only a mechanical clearance. The beam 50 is fitted through the apertures 98 and thus the tool passing apertures e.g. 347, 349, are precisely aligned.

A significant benefit of this rigorous alignment of spacer apertures 347, 349 along axis A—A, lies in the added support the spacers 348 are now able to give to the mounting plate 334. The conventional increased size of the spacer apertures 47, 49 shown in the PRIOR ART Figures has hitherto precluded superimposing onto the mounting plate apertures 37 a sufficient portion of the spacers 48 to block mounting plate distortions. With reduced size spacer apertures 347, 349, and holding the mounting plate apertures 337 the same, the manufacturer can register the spacer aperture edge margins 347a, 347a with the edge margins 337a of the mounting plate apertures 337. Upon driving the staking tool ball 46 through the mounting plate boss bore 39, tendencies toward distortion of the mounting plate, especially at the flange 393 are blocked by the increased support against distortion provided by the spacers 348, particularly at the edge margins 347a, 347a of the mounting plate flanges apertures 347, 349.

In its method aspects, this part of the invention provides a method of building a head stack assembly from an array 322 of head stack assembly subassemblies 324 comprising apertured actuator arms 326, mounting plates 334, and load beams 332 in aperture registered relation for staking with a ball 346, including supporting a series of apertured spacers 328 between successive subassemblies with the spacer aperture edge margins 347a, 347a registered with and superimposed on the mounting plate edge margins 337a to support the mounting plates against distortion during staking, and maintaining the alignment from a locus spaced from and parallel to the array with an alignment beam.

In a typical change, the prior art spacer aperture 47, 49 have a diameter of 0.090 to 0.093 inch. In the present apparatus, that aperture diameter (347, 349) is reduced to just 0.083 inch. The staking ball 46 may be either (or both) 0.079 or 0.081 inch. Thus the clearance for the ball 46 in the invention is only 0.001 or 0.002 inch through the spacer 48, versus a minimum of 0.0045 inch and as much as 0.0055 inch or more in the prior art. The result is more of the edge margin 337a is supported against distortion with the invention.

The invention thus better supports the mounting plate during staking, improves the registration of spacer aperture edge margins with the mounting plate edge margins, and separately aligns the spacers from a locus spaced from the primary axis of staking. The invention apparatus by having the nosepiece engagement head swivel or pivot relative to its mounting enables full contact with the opposing subassembly surface for reduced misalignment of the stacked subassemblies during staking operations and smaller yield losses with presently available levels of surface precision in head stack components.

The foregoing objects of the invention are met.

I claim:

1. An apparatus for building head stack assemblies from an array of head stack subassemblies disposed generally perpendicular to a common axis, each head stack subassembly comprising an arm of a common actuator having a plurality of arms, a load beam and a mounting plate to be staked together through a series of apertures therein with a staking tool, said apparatus comprising a baseplate, an engagement nosepiece having an engagement head having a staking tool passing aperture, said nosepiece comprising a first body adapted for axial shifting relative to said baseplate in subassembly clamping relation, said engagement head defining a second body, said second body being pivotally mounted to said first body; a separately formed fastener connecting and limiting separation of said first and second bodies during relative pivoting movement; and a series of spacers between successive subassembiles in said array, said spacers having apertures registered with said staking tool passing aperture, said engagement head being pivotable on said engagement nosepiece for flush engagement with said subassembly array at different angles of said array to said nosepiece while maintaining said registration of spacer apertures and said head staking tool passing aperture for uniform application of clamping force to said array regardless of said different angles of said array.

2. The apparatus according to claim 1, in which said common axis is a first common axis, and including also an alignment beam for said spacers disposed on a second common axis spaced from and parallel to said first common axis, said alignment beam maintaining said spacer apertures in registration with said subassembly apertures independently of said clamping apparatus.

3. The apparatus according to claim 1, in which said nosepiece engagement head staking tool passing aperture defines a staking tool guide for a staking tool.

4. The apparatus according to claim 3, in which said nosepiece first body and engagement head second body are coaxially apertured to define said staking tool guide.

5. The apparatus according to claim 1, in which said nosepiece first body is generally cylindrical, said engagement head second body is generally cylindrical and is supported by said first body in interfitting relation, said first and second bodies being coupled for relative pivoting movement permitting said second body to engage said subassembly array flush at the angle of presentation of said subassembly array to said engagement head within a angle range of about 0 to +/−3 degrees.

6. An apparatus for building head stack assemblies from an array of head stack subassemblies disposed generally penpendicular to a common axis, each head stack subassembly comprising an arm of a common actuator having a plurality of arms, a load beam and a mounting plate to be staked together through a series of apertures therein with a staking tool, said apparatus comprising a baseplate, an engagement nosepiece having an engagement head having a staking tool passing aperture, said nosepiece comprising a first body adapted for axial shifting relative to said baseplate in subassembly clamping relation, said engagement head defining a second body, said second body being pivotally mounted to said first body; a series of spacers between successive subassemblies in said array, said spacers having apertures registered with said staking tool passing aperture, said engagement head being pivotable on said engagement nosepiece for flush engagement with said subassembly array at different angles of said array to said nosepiece while maintaining said registration of spacer apertures and said head staking tool passing aperture for uniform application of clamping force to said array regardless of said different angles of said array, said second cylindrical body being interiorly open and terminating adjacent said subassembly array in a transverse wall having interiorly a dished shape, said first body having a cylindrical wall sized to fit within said second body cylindrical wall, said first body terminating adjacent said subassembly array in a dished wall complementary to said second body wall dished shape for pivoting engagement therewith; and a separately formed fastener connecting and limiting separation of said first and second bodies during relative pivoting movement.

7. An apparatus for building head stack assemblies from an array of head stack subassemblies disposed generally perpendicular to a common axis, each head stack subassembly comprising an arm of a common actuator having a plurality of arms, a load beam and a mounting plate to be staked together through a series of apertures therein with a staking tool, said apparatus comprising a baseplate, a nosepiece having an engagement head shiftable toward said baseplate in clamping relation against said subassemblies, and a series of spacers between successive subassemblies in said array, said engagement head being pivotable on said engagement nosepiece for flush engagement with said subassembly array at different angles of said array to said nosepiece for uniform application of clamping force to said array regardless of said different angles of said array, said nosepiece comprising a first body adapted for axial shifting relative to said baseplate in subassembly clamping relation, and a second body defining said engagement head, said second body being pivotally mounted to said first body, said second body being cylindrical and interiorly open, said second body terminating adjacent said subassembly array in a transverse wall having interiorly a dished shape, said first body having a cylindrical wall sized to fit within said second body cylindrical wall, said first body terminating adjacent said subassembly array in a dished wall complementary to said second body wall dished shape for pivoting engagement therewith, and a fastener limiting separation of said first and second bodies during relative pivoting movement, said first and second bodies being coupled for relative pivoting movement permitting said second body to engage said subassembly array flush at the angle of presentation of said subassembly array to said engagement head within an angle range of about 0 to +/−3 degrees, said fastener comprising at least one rod and groove combination in which a rod is fixed in one of said first and second bodies and a rod-receiving groove is defined in the other of said first and second bodies, said rod being undersized relative to said groove to permit pivoting movement of said second body relative to said first body without axial separation of said first and second bodies.

8. The apparatus according to claim 7, in which said second body cylindrical wall has a circularly distributed series of chordally located bores parallel to said second body transverse wall, each of said bores fixing a rod, said first body defining a circularly distributed series of rod-receiving chordally disposed grooves arranged to receive laterally an opposing rod fixed in a said second body bore in first and second body coupling relation, said rods and bores being relatively sized to permit pivoting movement of said first body within said second body centered on their respective dished walls.

9. The apparatus according to claim 8, in which the relative size of said rods and grooves is such that said second body can pivot as much as three degrees in any direction relative to said first body.

10. The apparatus according to claim 1, in which said second body supports said first body in interfitting relation, said first and second bodies being resiliently coupled by said separately formed fastener for relative pivoting movement permitting said second body to engage said subassembly array flush at the angle of presentation of said subassembly array to said engagement head within a angle range of about 0 to +/−3 to degrees.

11. An apparatus for building head stack assemblies from in array of head stack subassemblies disposed generally perpendicular to a common axis, each head stack subassembly comprising an arm of a common actuator having a plurality of arms, a load beam and a mounting plate to be staked together through a series of apertures therein with a staking tool, said apparatus comprising a baseplate a nosepiece having an engagement head shiftable toward said baseplate in clamping relation against said subassemblies, and a series of spacers between successive subassemblies in said array, said engagement head being pivotable on said engagement nosepiece for flush engagement with said subassembly array at different angles of said array to said nosepiece for uniform application of clamping force to said array regardless of said different angles of said array, said nosepiece comprising first body adapted for axial shifting relative to said baseplate in subassembly clamping relation, and a second body defining said engagement head, said second body being pivotally mounted to said first body, said first body being generally cylindrical, said second body being generally cylindrical and supporting said first body in interfitting relation, said first and second bodies being resiliently coupled for relative pivoting movement permitting said second body to engage said subassembly array flush at the angle of presentation of said subassembly array to said engagement head within an angle range of about 0 to +/−3 degrees, said second cylindrical body terminating adjacent said subassembly array in a transverse wall having interiorly a dished shape, said first body having a cylindrical wall sized to fit onto said second body, said first body terminating in a dished wall complementary to said second body wall dished shape for pivoting engagement therewith, and a spring member coupling and resiliently limiting separation of said first and second bodies during relative pivoting movement.

12. The apparatus according to claim 11, in which each of said first and second bodies defines spring member fasteners fastening said spring members in position to permit pivoting movement of said second body relative to said first body without axial separation of said first and second bodies.

13. The apparatus according to claim 12, in which said spring member comprises plural springs circularly distributed about said first and second bodies, said springs being such that said second body can pivot as much as three degrees in any direction relative to said first body.

14. An apparatus for building head stack assemblies from an array of three or more head stack subassemblies that are axilly elongated and disposed generally parallel with each other and perpendicular to a common axis defined by a staking tool path through said array, each head stack subassembly comprising an arm of a common actuator having a plurality of arms, a load beam and a mounting plate, said arms, load beams and mounting plates having registered staking apertures coaxial with said common axis, said apparatus comprising a relatively fixed baseplate, a relatively movable nosepiece having an engagement head shiftable toward said baseplate on said common axis in subassembly clamping relation, said nose piece and said engagement head being coaxially apertured on said common axis, and a series of apertured spacers between successive subassemblies in said array, said engagement head pivoting in response to contact with the opposing surface of said array to be flush with said array at the locus of said contact whether or not said array opposing surface is angled or perpendicular to said common axis and to exert a uniform force on said array throughout said locus of contact; said coaxially apertured nosepiece and engagement head defining a tubular guide for a staking tool comprising a staking ball adapted to be forced through said apertures of said subassemblies in staking relation, said tubular guide being registered with said registered staking apertures said nosepiece comprising a first body and a second body, said first body being generally cylindrical, said second body being generally cylindrical and supported by said first body on a pivot, said first and second bodies being coupled by a separate fastener for relative movement permitting said second body to lie flush against said subassembly array at different angles of presentation of said subassembly array to said engagement head.

15. The apparatus according to claim 14, in which said second body will pivot up to three degrees in any direction to lie flush against said subassembly array.

16. The apparatus according to claim 15, including also a series of circularly distributed grooves on the periphery of said first body, and a series of rods passing chordally through said second body in first body grooves-intersecting relation to couple said first and second bodies to each other in pivoting relation.

* * * * *

UNITED STATES PATENT AND TRADEMARK OFFICE
CERTIFICATE OF CORRECTION

PATENT NO.   : 6,295,723 B1
DATED        : October 2, 2001
INVENTOR(S)  : Coon

It is certified that error appears in the above-identified patent and that said Letters Patent is hereby corrected as shown below:

Column 12,
Line 64, "subassembiles" should read -- subassemblies --

Column 13,
Line 30, "penpendicular" should read -- perpendicular --

Column 14,
Line 55, "in" should read -- an --
Line 60, after "baseplate" insert -- , --

Column 15,
Line 23, "members" should read -- member --

Signed and Sealed this

Twenty-first Day of January, 2003

JAMES E. ROGAN
*Director of the United States Patent and Trademark Office*